United States Patent
Havlir et al.

(10) Patent No.: US 10,613,987 B2
(45) Date of Patent: Apr. 7, 2020

(54) OPERAND CACHE COHERENCE FOR SIMD PROCESSOR SUPPORTING PREDICATION

(71) Applicant: Apple Inc., Cupertino, CA (US)

(72) Inventors: Andrew M. Havlir, Orlando, FL (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 329 days.

(21) Appl. No.: 15/274,098

(22) Filed: Sep. 23, 2016

(65) Prior Publication Data

US 2018/0089090 A1    Mar. 29, 2018

(51) Int. Cl.
  *G06F 9/38* (2018.01)
  *G06F 9/30* (2018.01)
  *G06F 12/0875* (2016.01)
  *G06F 12/0888* (2016.01)

(52) U.S. Cl.
  CPC ...... *G06F 12/0875* (2013.01); *G06F 9/30058* (2013.01); *G06F 9/30072* (2013.01); *G06F 9/383* (2013.01); *G06F 9/3867* (2013.01); *G06F 12/0888* (2013.01); *G06F 2212/452* (2013.01)

(58) Field of Classification Search
  CPC .......................... G06F 9/30058; G06F 9/3867
  See application file for complete search history.

(56) References Cited

U.S. PATENT DOCUMENTS 6,289,417 B1  9/2001 Larri
6,513,109 B1  1/2003 Gschwind et al.
6,883,089 B2  4/2005 Kling et al.
7,930,522 B2  4/2011 Shumeli et al.
(Continued)

FOREIGN PATENT DOCUMENTS

EP  0717359  6/1996
TW  201015318  4/2010
(Continued)

OTHER PUBLICATIONS

Prabhu, Interaction policies with main memory, Jul. 7, 2015, 3 pages, [retrieved from the internet on May 31, 2018], retrieved from URL <web.cs.iastate.edu/~prabhu/Tutorial/Cache/interac.html>.*

*Primary Examiner* — Jyoti Mehta
(74) *Attorney, Agent, or Firm* — Kowert, Hood, Munyon, Rankin & Goetzel, P.C.

(57) ABSTRACT

In some embodiments, a system includes an execution unit, a register file, an operand cache, and a predication control circuit. Operands identified by an instruction may be stored in the operand cache. One or more entries of the operand cache that store the operands may be marked as dirty. The predication control circuit may identify an instruction as having an unresolved predication state. Subsequent to initiating execution of the instruction, the predication control circuit may receive results of the at least one unresolved conditional instruction. In response to the results indicating the instruction has a known-to-execute predication state, the predication control circuit may initiate writing, in the operand cache, results of executing the instruction. In response to the results indicating the instruction has a known-not-to-execute predication state, the predication control circuit may prevent the results from executing the instruction from being written in the operand cache.

20 Claims, 9 Drawing Sheets

(56) References Cited

U.S. PATENT DOCUMENTS

| | | |
|---|---|---|
| 2005/0289299 A1 | 12/2005 | Nunamaker et al. |
| 2006/0064451 A1* | 3/2006 | Mehta .................... G06F 7/505 |
| | | 708/524 |
| 2008/0022044 A1 | 1/2008 | Nunamaker et al. |
| 2011/0161593 A1 | 6/2011 | Yamazaki |
| 2012/0047329 A1 | 2/2012 | Goel et al. |
| 2013/0086364 A1 | 4/2013 | Gschwind et al. |
| 2013/0159628 A1 | 6/2013 | Choquette et al. |
| 2013/0246708 A1 | 9/2013 | Ono et al. |
| 2015/0054837 A1* | 2/2015 | Havlir ................ G06F 9/30072 |
| | | 345/506 |

FOREIGN PATENT DOCUMENTS

| | | |
|---|---|---|
| WO | 9003001 | 3/1990 |
| WO | WO 02/46887 A2 | 6/2002 |

* cited by examiner

| | | | | |
|---|---|---|---|---|
| Destination operand miss in operand cache | No unresolved conditionals in pipeline | Instance of instruction is known-to-execute | | Mark operand cache entry state as dirty and do not read register file |
| | | Instance of instruction is known-not-to-execute | | Mark operand cache entry state as undefined and do not read register file |
| | At least one unresolved conditional in pipeline | Instance of instruction is unresolved | | Mark operand cache entry state as dirty and read register file |
| | | Instance of instruction is known-to-execute | | Mark operand cache entry state as dirty and read register file |
| | | Instance of instruction is known-not-to-execute | | Mark operand cache entry state as clean and read register file |
| Destination operand hit in operand cache | No unresolved conditionals in pipeline | Instance of instruction is known-to-execute | | Mark operand cache entry state as dirty and do not read register file |
| | | Instance of instruction is known-not-to-execute | | Do not change operand cache entry state and do not read register file |
| | At least one unresolved conditional in pipeline | Instance of instruction is unresolved | Entry is dirty | Leave operand cache entry state as dirty and do not read register file |
| | | Instance of instruction is unresolved | Entry is clean | Mark operand cache entry state as dirty and do not read register file |
| | | Instance of instruction is unresolved | Entry is undefined | Mark operand cache entry state as dirty and read register file |
| | | Instance of instruction is known-to-execute | | Mark operand cache entry state as dirty and do not read register file |
| | | Instance of instruction is known-not-to-execute | | Do not change operand cache entry state and do not read register file |

*FIG. 6*

OPERAND CACHE COHERENCE FOR SIMD PROCESSOR SUPPORTING PREDICATION

BACKGROUND

Technical Field

This disclosure relates generally to an instruction predication circuit control system.

Description of the Related Art

Systems often have execution units execute the same series of instructions multiple times with different input data. This process is often related to graphics processing, with reference to different graphics elements (e.g., pixels or vertices). The sequences of instructions at different execution units are often slightly different (e.g., a group of instructions are skipped by one execution unit but are executed by another). A controller may determine whether a respective instance of an instruction should be executed by a given execution unit, a process called predication. If the execution unit is known not to execute a respective instance of a particular instruction, the system may save power, time, or both, by the execution unit skipping portions of the instruction (e.g., fetching data used by the instruction). However, the controller may be unable to determine whether the respective instance of the instruction should be executed by an execution unit until results of one or more unresolved conditional instructions (e.g., branch instructions) have been determined.

One way to resolve this problem is by delaying the execution of future instructions (e.g., using multithreading) until the unresolved conditional instructions have been resolved. However, delaying execution of instructions may result in execution of the series of instructions taking a longer amount of time.

SUMMARY

In various embodiments, an instruction predication circuit control system is disclosed that includes a single instruction multiple data (SIMD) circuit, a register file, an operand cache, and a predication control circuit. The SIMD circuit may include a plurality of execution units that may execute parallel data instances of a series of instructions. In some embodiments, the SIMD circuit may be at least a portion of a graphics processing unit (GPU). The register file may store a plurality of operands. The operand cache may cache a subset of the plurality of operands for use by at least a particular one of the plurality of execution units. The predication control circuit may identify, based on a pipeline of the particular execution unit including at least one unresolved conditional instruction, that an instance of an instruction in that pipeline has an unresolved predication state. If one or more operands indicated by the instruction are not stored in the operand cache, the predication control circuit may copy the one or more operands from the register file to the operand cache. Before determining whether the instance of the instruction has a known-to-execute predication state or a known-not-to-execute predication state, the predication control circuit may initiate execution of the instance of the instruction at the particular execution unit. Subsequent to initiating execution of the instance of the instruction, the predication control circuit may receive results of the unresolved conditional instruction and may determine whether the instance of the instruction has the known-to-execute predication state or the known-not-to-execute predication state. If the instance of the instruction has the known-to-execute predication state, the predication control circuit may initiate writing results of executing the instance of the instruction to the operand cache. If the instance of the instruction has the known-not-to-execute predication state, the predication control circuit may prevent the results of executing the instance of the instruction from being written to the operand cache. Regardless of the predication state of the instance of the instruction, the predication control circuit may copy at least one operand corresponding to the instance of the instruction from the operand cache to the register file. Accordingly, an operand cache may be managed such that an instance of an instruction may be executed without knowledge of a predication state of the instance of the instruction. Further, coherence between the operand cache and the register file may be maintained.

BRIEF DESCRIPTION OF THE DRAWINGS

FIG. 6 is a table illustrating one embodiment of an operand cache management scheme.

Figure 1:
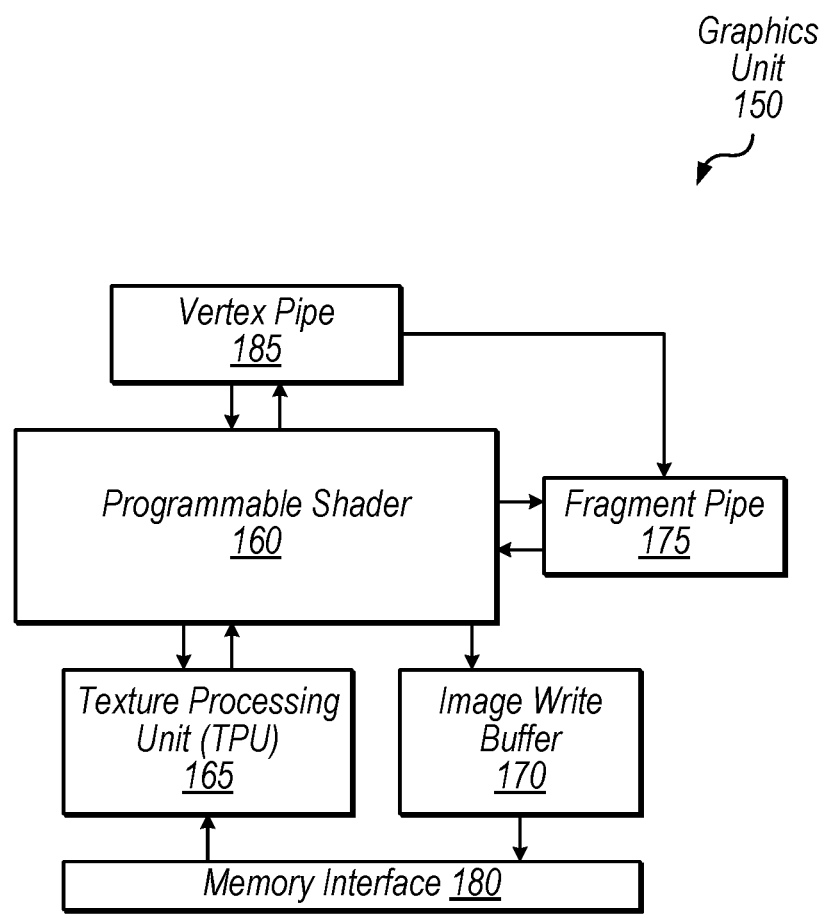
FIG. 1 is a block diagram illustrating one embodiment of a graphics processing unit that includes an instruction predication circuit control system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file that includes six entries, the terms "first entry" and "second entry" can be used to refer to any two of the six entries, and not, for example, just logical entries 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

An instruction predication circuit control system is described herein including at least one execution unit, a register file, an operand cache, and a predication control circuit. The execution unit may execute a sequence of instructions. The register file may store operands of the instructions. The operand cache may cache a subset of the operands stored at the register file. The predication control circuit may determine a predication state of an instance of a particular instruction of the sequence of instructions. For example, based on the instance of the particular instruction depending from at least one unresolved conditional instruction, the instance of the particular instruction may be identified as having an unresolved predication state. The predication control circuit may initiate execution of the instance of the particular instruction, even though the instance of the particular instruction may later be identified as having the known-not-to-execute predication state. As a result, in some cases, the sequence of instructions may be completed more quickly, as compared to a system that delays execution of the instance of the particular instruction until the predication state of the instance of the particular instruction is identified.

When the instance of the particular instruction is identified as having the unresolved predication state, the operand cache and the register file may be controlled in a specific manner to maintain coherency between the operand cache and the register file. In some cases, depending on operands stored at the operand cache, one or more operands may be copied from the register file to the operand cache. At least an entry of the operand cache corresponding to a destination operand may be marked as dirty. Subsequent to initiating execution of the instance of the particular instruction, results of the at least one unresolved conditional instruction may be received. The predication control circuit may determine the predication state of the instance of the particular instruction based on the results of the at least one unresolved conditional instruction. In response to identifying a known-to-execute predication state, the predication control circuit may initiate writing results of the instance of the particular instruction in the operand cache. In response to identifying a known-not-to-execute predication state, the predication control circuit may prevent the results of the instance of the particular instruction from being written in the operand cache. Regardless of whether the results of the instance of the particular instruction were written, the predication control circuit may cause at least one operand to be copied from the operand cache to the register file (e.g., the destination operand). As a result, the instance of the particular instruction may be executed without knowing the predication state of the instance of the instruction.

As used herein, "depending from" is a broad term that refers to a relationship between a first instruction that occurs before a second instruction in a sequence of instructions executed by a same execution unit. The second instruction is described herein as depending from the first instruction. To illustrate, a second instruction depends from a first instruction when the second instruction has a differing predication state based on an outcome of the first instruction (e.g., because the second instruction is skipped if the first instruction resolves in a certain way). As described herein, an instance of a second instruction may be considered to "depend from" a first instruction if the instance of the second instruction depends from a respective instance of the first instruction.

Three predication states are discussed herein: a "known-to-execute" predication state, a "known-not-to-execute" predication state, and an "unresolved" predication state. The "known-to-execute" predication state refers to instances of instructions that are expected to be completed. The "known-not-to-execute" predication state refers to instances of instructions that are expected not to be completed. The "unresolved" predication state refers to instances of instructions where the system has not yet determined the predication state. For example, an instance of an instruction may have the "known-to-execute" predication state or the "known-not-to-execute" predication state, but the system may not have determined which predication state applies. Accordingly, the system may identify the instance of the instruction as having the "unresolved" predication state. In some embodiments, the system may have not yet determined the predication state for the instance of the instruction due to the instance of the instruction depending from one or more conditional instructions that have not yet finished execution (one or more unresolved conditional instructions). In some embodiments, other predication states may be used in addition to the "known-to-execute", "known-not-to-execute", and "unresolved" predication states.

This disclosure initially describes, with reference to FIG. 1, various embodiments of a graphics processing unit (GPU) that includes an instruction predication circuit control system. Various embodiments of an instruction predication circuit control system are described with reference to FIG. 2. An example instruction pipeline of an instruction predication circuit control system is described with reference to FIG. 3. A method of controlling an instruction predication circuit is described with reference to FIG. 4. FIGS. 5A-C describe one example of how operands are managed at an operand cache and a register file in one embodiment of an instruction predication circuit control system. A table illustrating ways of managing entries in one embodiment of an instruction predication circuit control system is described with reference to FIG. 6. An embodiment of a computing system that includes an instruction predication circuit control system is described with reference to FIG. 7. Finally, a process of fabricating one embodiment of an instruction predication circuit control system is described with reference to FIG. 8.

Turning now to FIG. 1, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process data (e.g., graphics data) in parallel using multiple execution pipelines or instances. In some embodiments, the multiple execution pipelines correspond to a plurality of execution units of an instruction predication circuit control system.

Vertex pipe 185, in the illustrated embodiment, may include various fixed-function hardware configured to process vertex data. Vertex pipe 185 may be configured to communicate with programmable shader 160 to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The embodiment of FIG. 1 shows one possible configuration of a graphics unit 150 for illustrative purposes.

Figure 2:
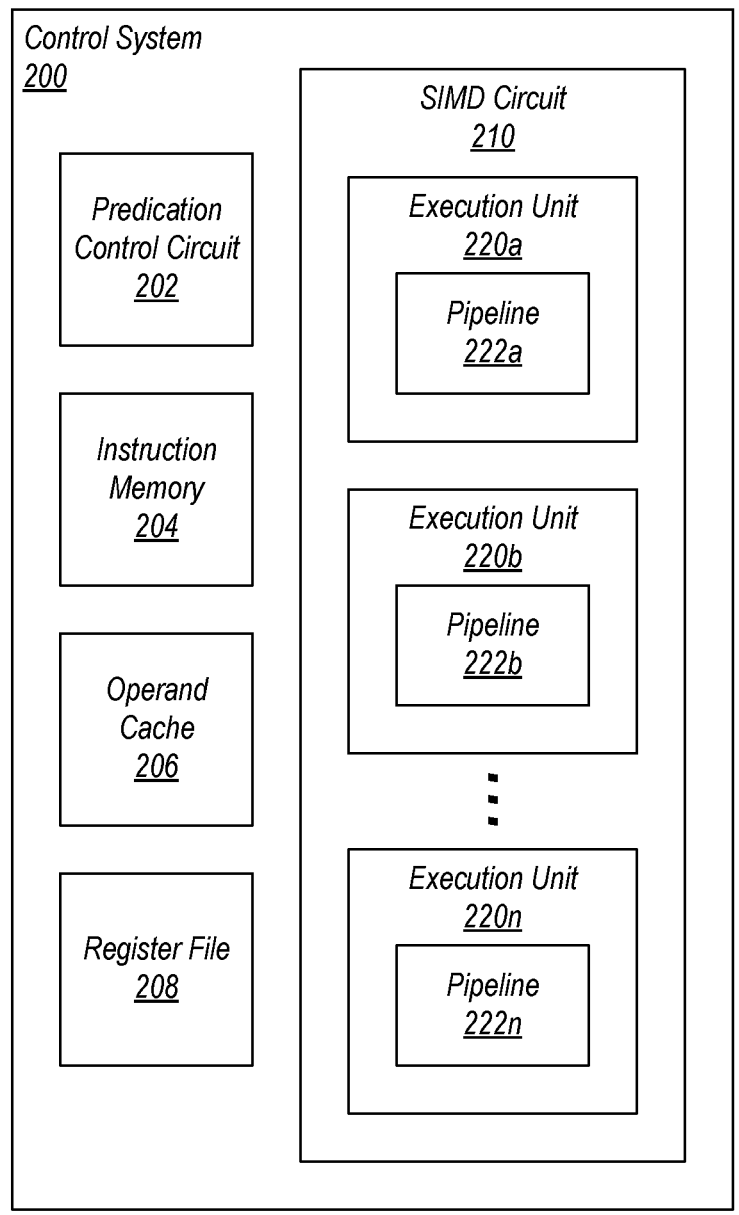
FIG. 2 is a block diagram illustrating one embodiment of an instruction predication circuit control system.

Turning now to FIG. 2, a block diagram of an embodiment of an instruction predication circuit control system. In the illustrated embodiment, the instruction predication circuit control system includes control system 200. Control system 200 includes predication control circuit 202, instruction memory 204, operand cache 206, register file 208, and single instruction multiple data (SIMD) circuit 210. SIMD circuit 210 includes execution units 220a-n. Execution units 220a-n include respective pipelines 222a-n. In some embodiments, control system 200 may include multiple instances of various devices. For example, control system 200 may include multiple predication control circuits 202, where at least some of the multiple predication control circuits 202 correspond to different execution units of execution units 220a-n. Similarly, control system 200 may include at least one of multiple instruction memories 204, multiple operand caches 206, or multiple register files 208. In some embodiments, various portions of control system 200 may be part of a single integrated circuit or multiple integrated circuits. In various embodiments, some or all of control system 200 may be part of one or more devices of graphics unit 150 of FIG. 1.

As discussed above, execution units 220a-n of SIMD circuit 210 may execute respective instances of a sequence of instructions in parallel using different data. As a result, some instructions may be executed in a first execution unit (e.g., execution unit 220a) but not executed in a second execution unit (e.g., execution unit 220b). Additionally, in some cases, one or more instructions may be executed differently in different execution units. For example, a conditional branch instruction may be taken by a first execution unit but not taken by a second execution unit. In the illustrated embodiment, the sequence of instructions are received from instruction memory 204. As discussed further below with reference to FIG. 3, the sequence of instructions may be pipelined in respective pipelines 222a-n. Because the sequence of instructions is pipelined, a conditional instruction may be unresolved when a predication state of a particular instruction depending from the conditional instruction is determined. Execution units 220a-n may execute respective instances of the particular instruction. If a known-to-execute predication state is instead identified for an instance of a particular instruction, the execution unit may execute the instance of the particular instruction. If a known-not-to-execute predication state is identified for an instance of a particular instruction, the execution unit may refrain from executing the instance of the particular instruction (e.g., by replacing the instance of the particular instruction with one or more NOP instructions).

Register file 208 may store operands used by execution units 220a-n to execute the respective instances of the sequence of instructions. Operand cache 206 may store a subset of the operands stored at register file 208. In various embodiments, execution units 220a-n may retrieve data from operand cache 206 more quickly, as compared to register file 208. As discussed further below with reference to FIG. 6, entries of operand cache 206 may be marked as clean or dirty. When an entry of operand cache 206 is marked as being dirty, the entry may be subsequently written to register file 208 to maintain coherence. Similarly, in some embodiments, entries of register file 208 may be marked as dirty and may be subsequently copied to operand cache 206 (e.g., for a system including multiple operand caches).

Predication control circuit 202 may control execution of instructions at execution units 220a-n. In particular, predication control circuit 202 may determine predication states of respective instances of instructions in pipelines 222a-n, instruct execution units 220a-n to execute respective instances of instructions, may control communications between execution units 220a-n and operand cache 206, and may control communications between operand cache 206 and register file 208. In various embodiments, predication control circuit 202 may include one or more management or control circuits (e.g., memory controllers) of at least one of operand cache 206, register file 208, or one or more of execution units 220a-n.

In various embodiments, predication control circuit 202 may control execution units 220a-n, operand cache 206, and register file 208 to maintain coherence of operand cache 206. In particular, predication control circuit 202 may copy operands indicated by a particular instruction having an unresolved predication state or a known-to-execute predication state at a pipeline (e.g., pipeline 222a) from register file 208 to operand cache 206. The operands may be source operands, destination operands, or both. One or more entries of operand cache 206 storing one or more of the operands (e.g., one or more destination operands) may be marked as being dirty. In the case of an instance of an instruction having an unresolved predication state, as discussed below with reference to FIGS. 5A-C, predication control circuit 202 may cause the instance of the instruction to be executed. If predication control circuit 202 subsequently determines that the instance of the instruction has a known-to-execute predication state, a result of executing the instance of the instruction may be written to operand cache 206. For example, the result may overwrite a destination operand copied from register file 208. If predication control circuit 202 subsequently determines that the instance of the instruction has a known-not-to-execute predication state, predication control circuit 202 may prevent a result of executing the instance of the instruction from being written in operand cache 206. Regardless of the predication state of the instance of the instruction, predication control circuit 202 may cause at least one operand corresponding to the instance of the instruction to be copied from operand cache 206 to register file 208. In some cases, the at least one operand is stored at the one or more entries of operand cache 206 marked as being dirty. Accordingly, operand cache 206 may maintain coherence with register file 208 even though instances of instructions identified as having a known-not-to-execute predication state are at least partially executed (e.g., while having an unresolved predication state).

In some embodiments, some instructions (e.g., conditional start and conditional loop test instructions) may be unable to change a sequence of instructions from a known-not-to-execute predication state to a known-to-execute predication state. Predication control circuit 202 may identify the instructions based on particular criteria. For example, predication control circuit 202 may store a user-specified list of instructions that meet the criteria. As another example, the instructions may include one or more identifiers that indicate that the instructions meet the criteria. Based on an instance of an instruction depending from one or more resolved conditional instructions and from unresolved conditional instructions that meet the criteria, predication control circuit 202 may identify a predication state of the instance of the instruction.

In some cases, predication control circuit 202 may identify an instruction as having a known-not-to-execute predication state for all of execution units 220a-n. Rather than perform actions associated with executing the instruction, predication control circuit 202 may cause the instruction to be marked in an instruction buffer as if it were executed. For example, predication control circuit 202 may set sequencing instruction indicating that the instruction is complete. Therefore, additional steps associated with execution of the instruction may be skipped.

Figure 3:
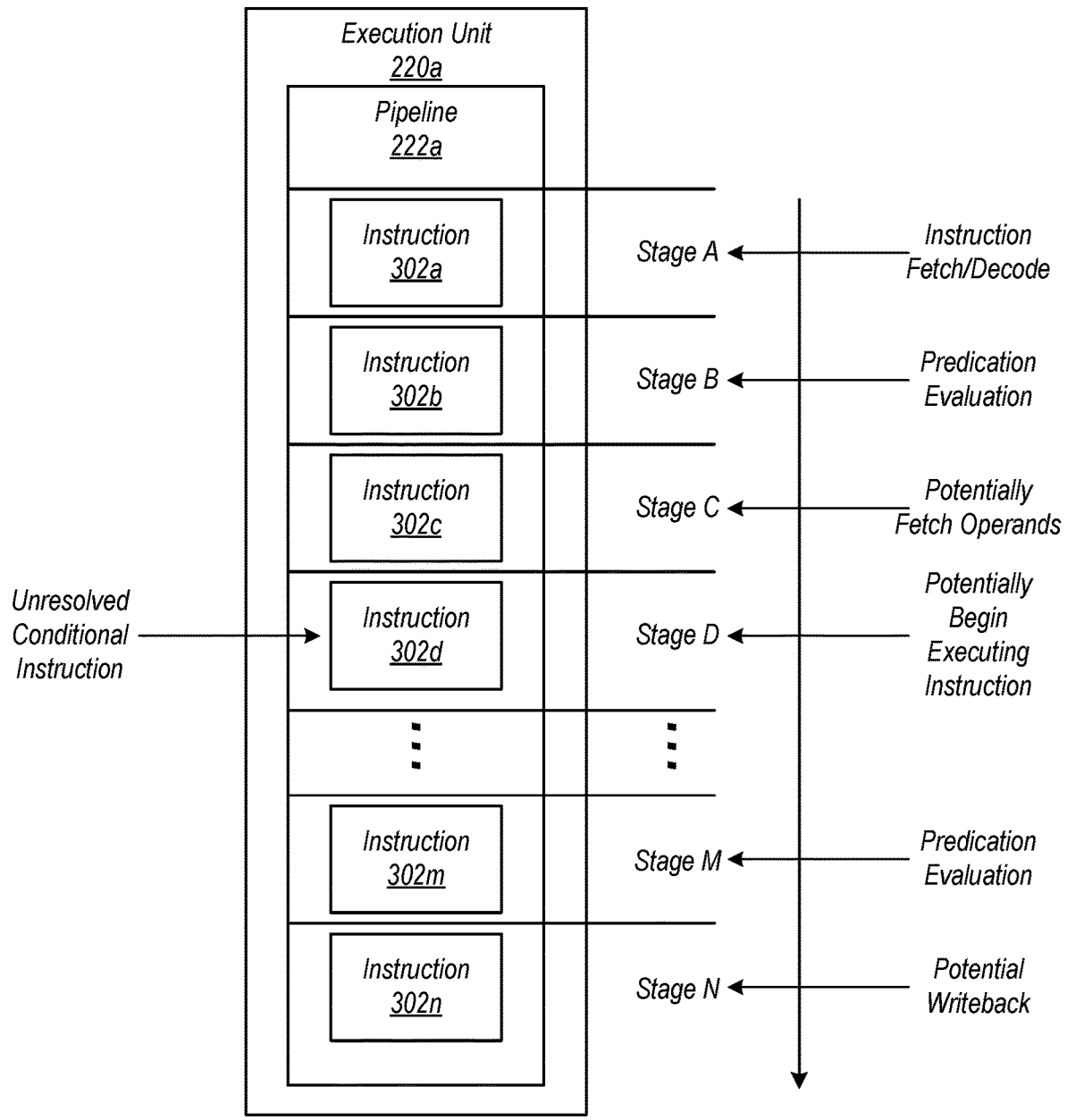
FIG. 3 is a block diagram illustrating one embodiment of an execution unit of an instruction predication circuit control system.

Turning now to FIG. 3, a block diagram illustrating an execution unit 220a of an embodiment of an instruction predication circuit control system is shown. As discussed above, execution unit 220a includes pipeline 222a. Pipeline 222a may include a respective instance of a plurality of instructions 302a-n for execution unit 220a. In the illustrated embodiment, instructions 302a-n are shown as being in various stages. In the illustrated, these stages are shown for explanatory purposes. Although, in some embodiments, an instruction proceeds through each illustrated stage during a different respective clock cycle, in other embodiments, instructions may proceed through multiple stages in a single clock cycle. In various embodiments, more or fewer stages of pipeline 222a are contemplated.

In the illustrated example, instruction 302a is in stage A, an instruction fetch/decode stage. Accordingly, during stage A, an instruction may be retrieved from instruction memory 204 of FIG. 2 and may be decoded. During stage B, a predication state of an instruction may be evaluated. As discussed above, the predication state may be determined by a predication control circuit. The predication state may be affected by one or more unresolved conditional instructions from which an instruction in stage B depends. For example, instruction 302b may depend from instruction 302d, an unresolved conditional instruction. The predication control circuit may determine that instruction 302b has an unresolved predication state.

Subsequent to determining a predication state, at stage C, one or more operands may potentially be retrieved from an operand cache (e.g., operand cache 206) during stage B. As discussed further with reference to FIG. 6, depending on whether one or more operands in pipeline 222a has an unresolved predication state, operands may be fetched from a register file to the operand cache for use by execution unit 220a.

Subsequent to fetching operands, at stage D, an instruction may potentially begin execution. In particular, in the illustrated embodiment, instructions having the known-to-execute predication state or the unresolved predication state may begin execution. As discussed above, if an instruction is identified as having a known-not-to-execute predication state, execution unit 220a may not execute the instruction (e.g., instead executing a NOP instruction). Execution may continue from stage D until stage M.

In the illustrated embodiment, at stage M, subsequent to execution, a predication control circuit may determine a predication state for instructions previously identified as having an unresolved predication state at stage B. For example, to refer to the earlier example, when instruction 302b reaches stage M, an indication of one or more results of instruction 302d (e.g., an outcome of a conditional of the conditional instruction) may have been received by the predication control circuit. Based on the indication, the predication control circuit may determine a predication state of instruction 302b during stage M. In some embodiments, the predication state of instruction 302b may be reevaluated prior to instruction 302b finishing execution.

At stage N, a result of an instruction may be potentially written back to an operand cache (e.g., operand cache 206). For example, if instruction 302n was determined to have a known-to-execute predication state, the predication control circuit may initiate writing results of instruction 302n to the operand cache.

Figure 4:
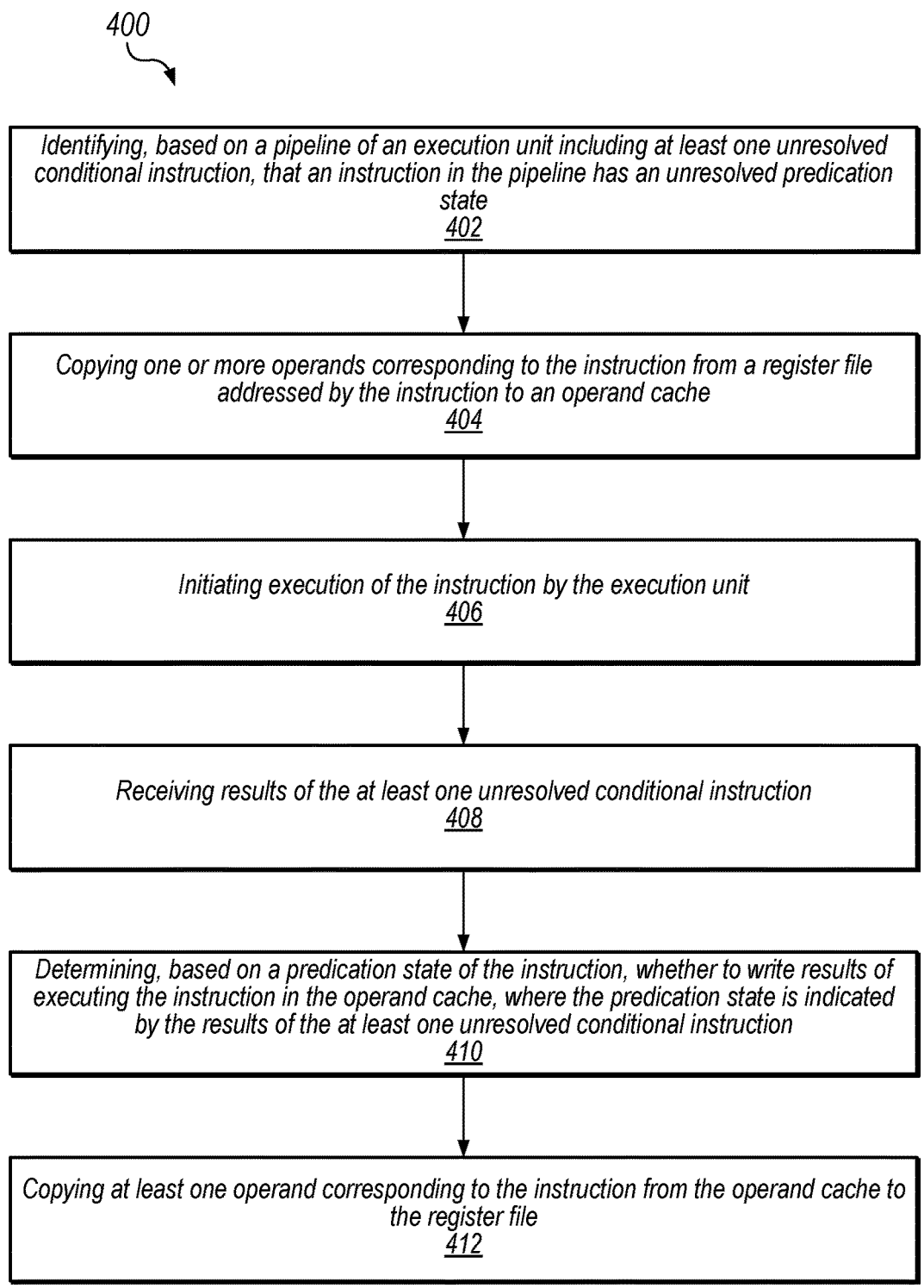
FIG. 4 is a flow diagram illustrating one embodiment of a method of operating a predication control circuit of an instruction predication circuit control system.
Figure 5A:
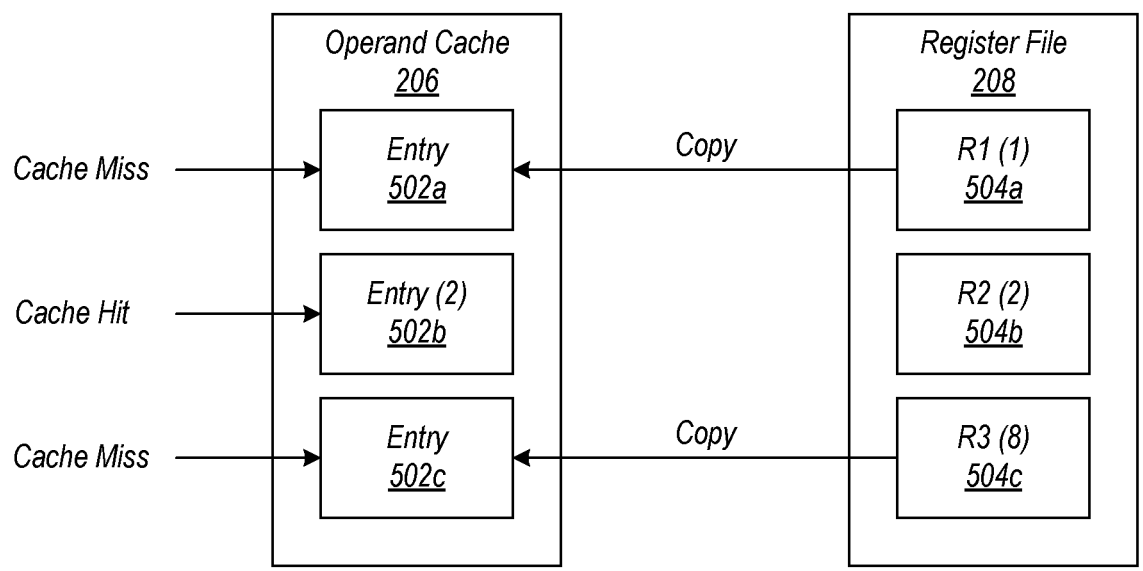
FIGS. 5A-5C are block diagrams illustrating an example operand cache control process.
Figure 5B:
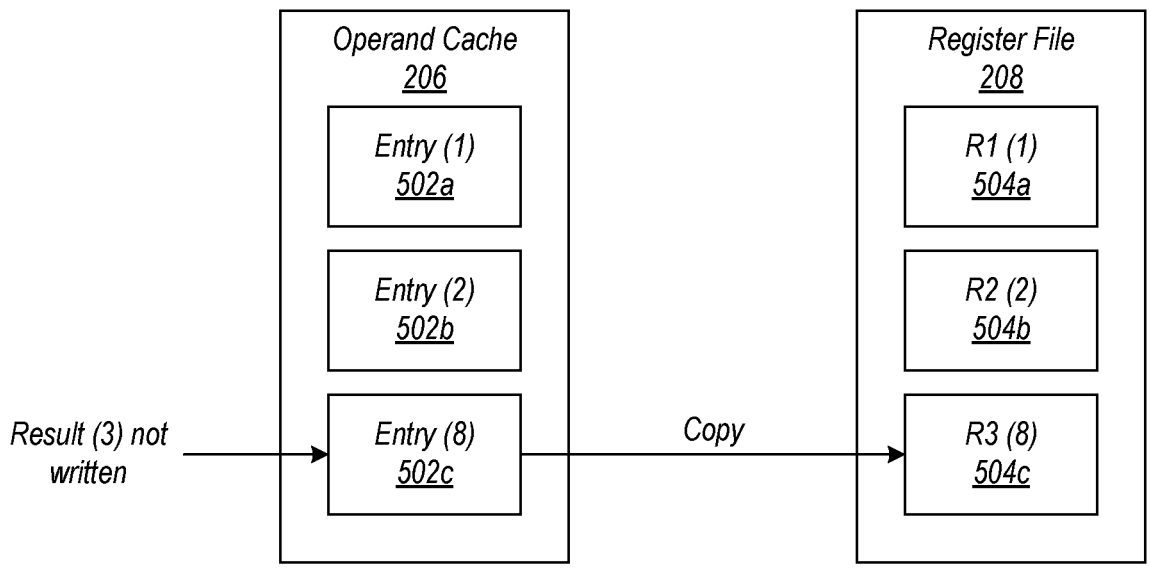
Figure 5C:
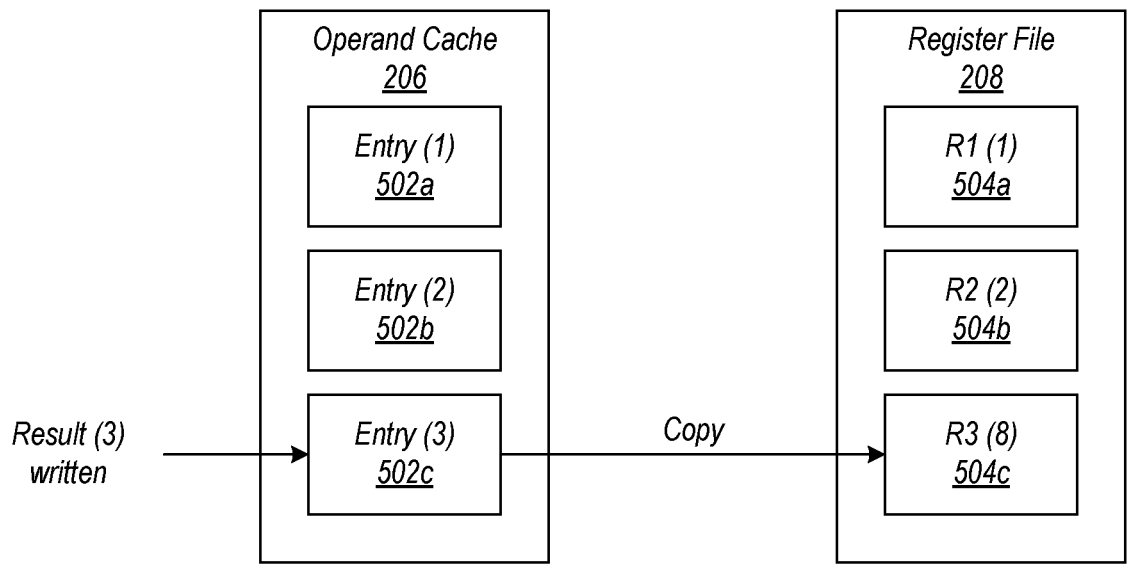

Referring now to FIG. 4, a flow diagram of a method 400 of operating a predication control circuit of an instruction predication circuit control system is depicted. In some embodiments, method 400 may be initiated or performed by one or more processors in response to one or more instructions stored by a computer-readable storage medium.

At 402, method 400 includes identifying, based on a pipeline of an execution unit including at least one unresolved conditional instruction, that an instruction in the pipeline has an unresolved predication state. For example, method 400 may include predication control circuit 202 of FIG. 2 identifying, based on pipeline 222a including instruction 302d (an unresolved conditional instruction), that instruction 302b has an unresolved predication state.

At 404, method 400 includes copying one or more operands corresponding to the instruction from a register file addressed by the instruction to an operand cache. For example, method 400 may include predication control circuit 202 copying one or more source operands, one or more destination operands, or both from register file 208 to operand cache 206. In some embodiments, one or more entries of the operand cache that store the one or more operands may be marked as dirty.

At 406, method 400 includes initiating execution of the instruction by the execution unit. For example, method 400 may include predication control circuit 202 initiating execution of instruction 302b at execution unit 220a.

At 408, method 400 includes receiving results of the at least one unresolved conditional instruction. For example, method 400 may include predication control circuit 202 receiving results of execution of instruction 302d.

At 410, method 400 includes determining, based on a predication state of the instruction, whether to write results of executing the instruction in the operand cache. The predication state may be indicated by the results of the at least one conditional instruction. For example, in response to the results of instruction 302d indicating instruction 302b has a known-to-execute predication state, predication control circuit 202 may initiate writing results of executing instruction 302b in operand cache 206. As another example, in response to the results of instruction 302d indicating instruction 302b has a known-not-to-execute predication state, predication control circuit 202 may prevent the results of executing instruction 302b from being written in operand cache 206.

At 412, method 400 includes copying at least one operand corresponding to the instruction from the operand cache to the register file. For example, predication control circuit 202 may copy at least one operand identified by instruction 302b from operand cache 206 to register file 208. Accordingly, a method of operating a predication control circuit of an instruction predication circuit control system is depicted.

In some embodiments, after 410 but before 412, one or more other instructions may be executed that may overwrite one or more of the at least one operand. In cases where the entries of the operand cache were marked as being dirty (e.g., at 404), 412 may copy contents of at least one entry that previously stored the at least one operand identified by instruction 302b.

Turning to FIGS. 5A-5C, operations performed in response to an instruction I1 being identified as having an unresolved predication state are shown. FIG. 5A illustrates operations performed prior to receiving results of execution of one or more unresolved conditional instructions. FIG. 5B illustrates operations performed subsequent to execution of the instruction when the instruction is identified as having a known-not-to-execute predication state. FIG. 5C illustrates operations performed subsequent to execution of the instruction when the instruction is identified as having a known-to-execute predication state. In the illustrated examples, operand cache 206 and register file 208 are shown. Operand cache 206 includes entries 502a-c. Register file includes R1-R3 504a-c.

In FIG. 5A, as discussed above with reference to FIG. 3, in response to determining that an instruction has an unresolved predicate, operand cache 206 may be filled with operands referred to by the instruction. In the illustrated embodiment, the instruction states that a value stored at R1 504a, (i.e., 1) should be added to a value stored at R2 504b (i.e., 2) and a result, 3, should be written in R3 504c, which currently stores a value of 8. Operand cache 206 may determine whether the operands referred to by the instruction are already stored at operand cache 206. In the illustrated embodiment, entry 502b already caches the value of R2 504b, resulting in a cache hit. However, operand cache 206 does not store the values of R1 504a and R3 504c. Accordingly, operands stored at R1 504a and R3 504c are copied to entries 502a and 502c, respectively. After operand cache 206 receives the operands from register file 208, the instruction I1 is executed.

In FIG. 5B, instruction I1 is identified as having a known-not-to-execute predication state. In the illustrated example, because of the predication state of I1 being known-not-to-execute, the result of instruction I1, 3, is not written to entry 502c. Additionally, the value stored at entry 502c, 8, is written to R3 504c. Accordingly, the value at R3 prior to executing the instruction I1 is maintained at both operand cache 206 and register file 208.

In FIG. 5C, instruction I1 is identified as having a known-to-execute predication state. In the illustrated example, because of the predication state of I1 being known-to-execute, the result of instruction I1, 3, is written in entry 502c, overwriting the previous value of 8. Subsequently, the value stored at entry 502c, 3, is written to R3 504c. Accordingly, both operand cache 206 and register file 208 are updated as a result of execution of instruction I1.

Turning next to FIG. 6, a table 600 illustrating one embodiment of an operand cache management scheme is depicted. Table 600 illustrates how entries of an operand cache are marked based on a predication state of one or more instances of instructions in a pipeline. For example, when a destination operand miss occurs in the operand cache, at least one unresolved conditional instruction is present in the pipeline, and a current instance of a current instruction is known-to-execute, the operand may be read from the register file, copied to the operand cache, and the entry of the operand cache may be marked as being dirty. As illustrated in table 600, in some cases, a state of an entry may also affect an operand cache entry state. For example, when a destination operand hit occurs in the operand cache, at least one unresolved conditional instruction is present in the pipeline, a current instance of a current instruction has an unresolved predication state, and the entry is undefined, the operand may be read from the register file, copied to the operand cache, and the entry of the operand cache may be marked as being dirty. As illustrated in table 600, entries may have the undefined operand cache entry state as a result of a destination operand miss in the operand cache where no unresolved conditional instructions are present in the pipeline and the instance of the instruction is known-not-to-execute.

In various embodiments, the operand cache may be managed for source operands as well. For example, in response to a source operand miss in the operand cache, the source operand may be copied from the register file to the operand cache and the entry of the operand cache may be marked as being clean. In response to a source operand hit in the operand cache, for entries of the operand cache having an undefined operand cache entry state, he source operand may be copied from the register file to the operand cache and the entry of the operand cache may be marked as being clean.

Figure 7:
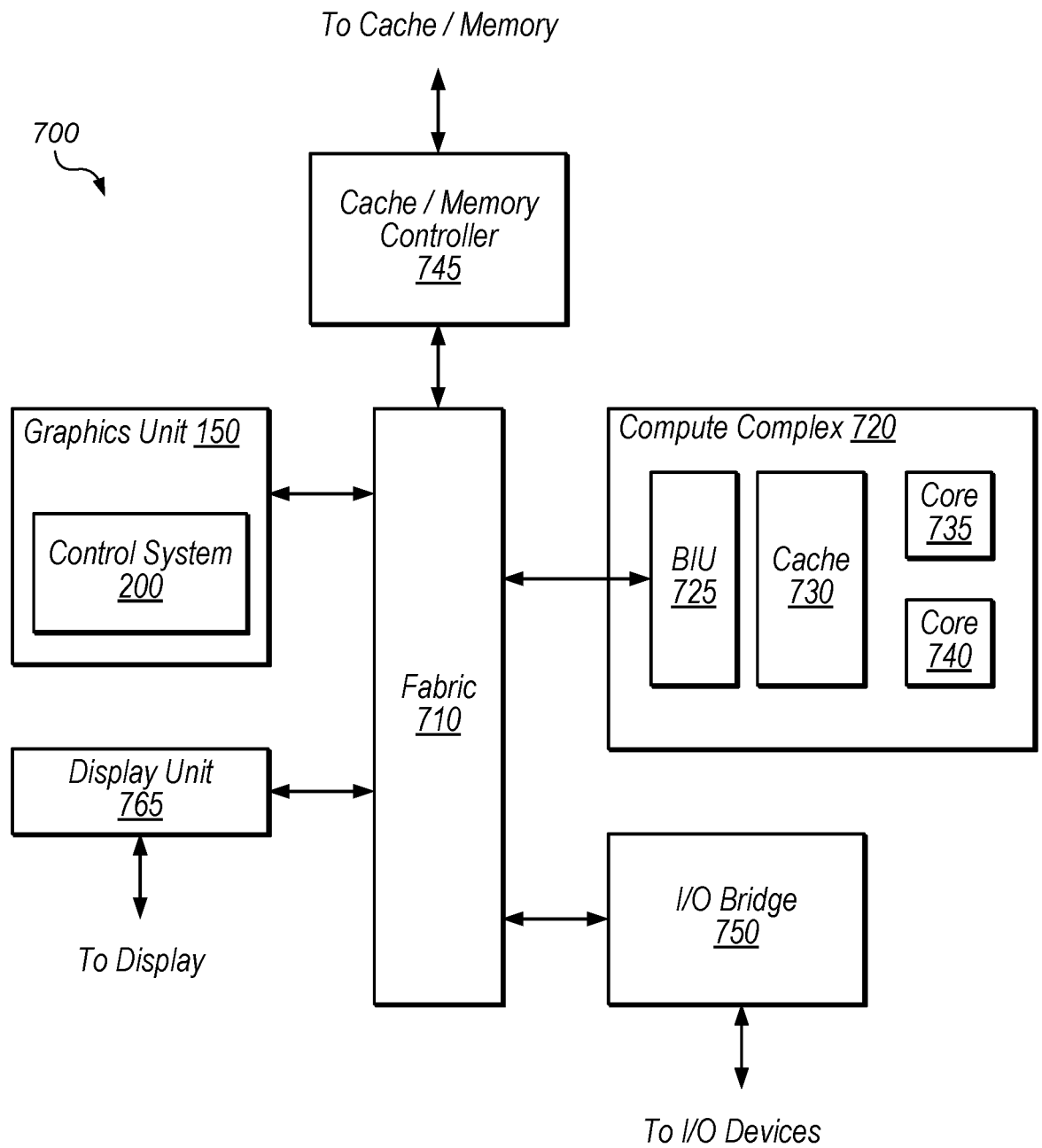
FIG. 7 is block diagram illustrating an embodiment of a computing system that includes at least a portion of an instruction predication circuit control system.

Turning next to FIG. 7, a block diagram illustrating an exemplary embodiment of a computing system 700 that includes at least a portion of an instruction predication circuit control system. The computing system 700 includes graphics unit 150 of FIG. 1. In some embodiments, graphics unit 150 includes one or more of the circuits described above with reference to FIG. 1, including any variations or modifications described previously with reference to FIGS. 1-6. Additionally, the computing system 700 includes control system 200 of FIG. 2. In some embodiments, control system 200 includes one or more of the circuits described above with reference to FIGS. 2-6, including any variations or modifications described previously with reference to FIGS. 2-6. In some embodiments, some or all elements of the computing system 700 may be included within a system on a chip (SoC). In some embodiments, computing system 700 is included in a mobile device. Accordingly, in at least some embodiments, area and power consumption of the computing system 700 may be important design considerations. In the illustrated embodiment, the computing system 700 includes fabric 710, graphics unit 150, compute complex 720, input/output (I/O) bridge 750, cache/memory controller 745, and display unit 765. Although the computing system 700 illustrates graphics unit 150 as being connected to fabric 710 as a separate device of computing system 700, in other embodiments, graphics unit 150 may be connected to or included in other components of the computing system 700. Additionally, the computing system 700 may include multiple graphics unit 150. The multiple graphics units 150 may correspond to different embodiments or to the same embodiment. Further, although in the illustrated embodiment, control system 200 is part of graphics unit 150, in other embodiments, control system 200 may be a separate device or may be included in other components of computing system 700.

Fabric 710 may include various interconnects, buses, MUXes, controllers, etc., and may be configured to facilitate communication between various elements of computing system 700. In some embodiments, portions of fabric 710 are configured to implement various different communication protocols. In other embodiments, fabric 710 implements a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In some embodiments, cores 735 and 740 may correspond to execution units of execution units 220a-n. In various embodiments, compute complex 720 includes various numbers of cores and/or caches. For example, compute complex 720 may include 1, 2, or 4 processor cores, or any other suitable number. In some embodiments, cores 735 and/or 740 include internal instruction and/or data caches. In some embodiments, a coherency unit (not shown) in fabric 710, cache 730, or elsewhere in computing system 700 is configured to maintain coherency between various caches of computing system 700. BIU 725 may be configured to manage communication between compute complex 720 and other elements of computing system 700. Processor cores such as cores 735 and 740 may be configured to execute instructions of a particular instruction set architecture (ISA), which may include operating system instructions and user application instructions.

Cache/memory controller 745 may be configured to manage transfer of data between fabric 710 and one or more caches and/or memories (e.g., non-transitory computer readable mediums). For example, cache/memory controller 745 may be coupled to an L3 cache, which may, in turn, be coupled to a system memory. In other embodiments, cache/memory controller 745 is directly coupled to a memory. In some embodiments, the cache/memory controller 745 includes one or more internal caches. In some embodiments, the cache/memory controller 745 may include or be coupled to one or more caches and/or memories that include instructions that, when executed by one or more processors (e.g., compute complex 720 and/or graphics unit 150), cause the processor, processors, or cores to initiate or perform some or all of the processes described above with reference to FIGS. 1-6 or below with reference to FIG. 8.

As used herein, the term "coupled to" may indicate one or more connections between elements, and a coupling may include intervening elements. For example, in FIG. 7, display unit 765 may be described as "coupled to" compute complex 720 through fabric 710. In contrast, in the illustrated embodiment of FIG. 7, display unit 765 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 700 via I/O bridge 750. In some embodiments, graphics unit 150 may be coupled to computing system 700 via I/O bridge 750.

Figure 8:
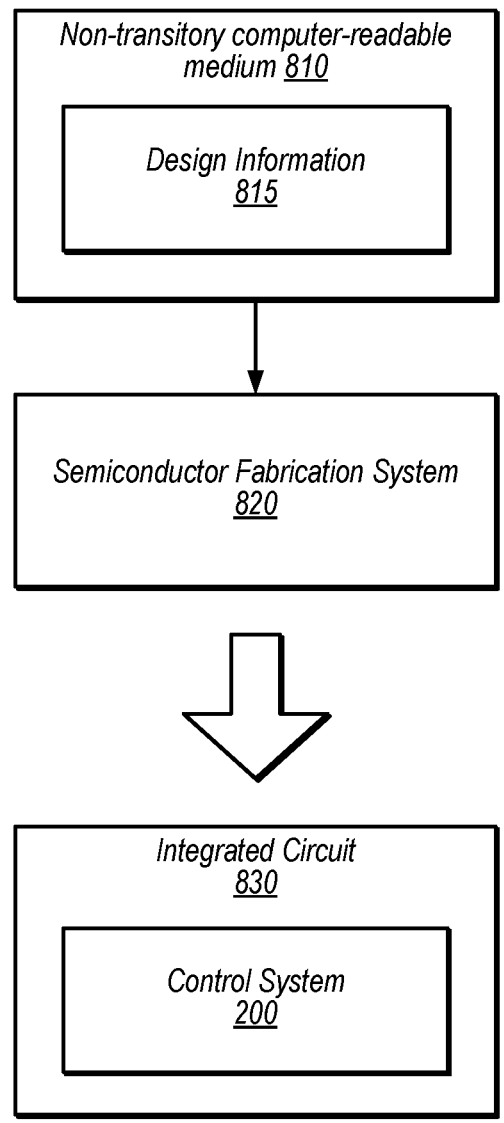
FIG. 8 is a block diagram illustrating one embodiment of a process of fabricating an instruction predication circuit control system.

FIG. 8 is a block diagram illustrating a process of fabricating an instruction predication circuit control system. FIG. 8 includes a non-transitory computer-readable medium 810 and a semiconductor fabrication system 820. Non-transitory computer-readable medium 810 includes design information 815. FIG. 8 also illustrates a resulting fabricated integrated circuit 830. Integrated circuit 830 includes control system 200 of FIG. 2. In the illustrated embodiment, semiconductor fabrication system 820 is configured to process design information 815 stored on non-transitory computer-readable medium 810 and fabricate integrated circuit 830.

Non-transitory computer-readable medium 810 may include any of various appropriate types of memory devices or storage devices. For example, non-transitory computer-readable medium 810 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 810 may include two or more memory mediums, which may reside in different locations (e.g., in different computer systems that are connected over a network).

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries, which specify the synthesis and/or layout of integrated circuit 830. In some embodiments, the design information is specified in whole or in part in the form of a netlist that specifies cell library elements and their connectivity.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements described with reference to FIGS. 1-7. Further, integrated circuit 830 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a single instruction multiple data (SIMD) circuit comprising a plurality of execution units configured to execute parallel data instances of a series of instructions;
a register file configured to store a plurality of operands;
an operand cache configured to cache a subset of the plurality of operands;
a predication control circuit configured to:
identify, based on a pipeline of a particular one of the plurality of execution units including at least one unresolved conditional instruction, that a particular instruction in that pipeline has an unresolved predication state;
in response to determining that one or more operands indicated by the particular instruction are not stored in the operand cache, copy the one or more operands from the register file to the operand cache;
mark at least one entry of the operand cache that stores at least one of the one or more operands as being dirty;
initiate execution of the particular instruction;
subsequent to initiating execution of the particular instruction, receive first results of the at least one unresolved conditional instruction;
in response to the first results indicating the particular instruction has a known-not-to-execute predication state:
prevent second results from executing the particular instruction from being written in the operand cache; and
based on marking the at least one entry as being dirty, copy at least one operand corresponding to the particular instruction from the operand cache to the register file.

2. The system of claim 1, wherein the one or more operands indicated by the particular instruction include a destination operand stored at a destination register indicated by the particular instruction to the operand cache.

3. The system of claim 2, wherein the predication control circuit is configured to copy the at least one operand from the operand cache to the register file by:
in response to the first results of the at least one unresolved conditional instruction indicating the particular instruction has the known-not-to-execute predication state, writing at least the destination operand to the destination register.

4. The system of claim 2, wherein the predication control circuit is configured to copy the at least one operand from the operand cache to the register file by:
in response to the first results of the at least one unresolved conditional instruction indicating the particular instruction has a known-to-execute predication state, writing at least the second results from executing the particular instruction to the destination register.

5. The system of claim 1, wherein the predication control circuit is further configured to identify that a different instruction in the pipeline has the known-not-to-execute predication state based on one or more resolved conditional instructions.

6. The system of claim 5, wherein the predication control circuit is configured, based on the different instruction depending from one or more unresolved conditional instructions that meet particular criteria, to identify the known-not-to-execute predication state.

7. The system of claim 1, wherein the predication control circuit is further configured to identify that a different instruction in the pipeline has a known-to-execute predication state based on one or more resolved conditional instructions.

8. The system of claim 7, wherein the predication control circuit is configured, based on the different instruction depending from one or more unresolved conditional instructions that meet particular criteria, to identify the known-to-execute predication state based on the one or more resolved conditional instructions.

9. The system of claim 1, wherein the predication control circuit is further configured to set sequencing information to indicate that execution of the particular instruction is complete in response to detecting that the particular instruction has the known-not-to-execute predication state in each execution unit of the plurality of execution units.

10. A method, comprising:
identifying, based on a pipeline of an execution unit including at least one unresolved conditional instruction, an instruction in the pipeline as having an unresolved predication state;
copying one or more operands corresponding to the identified instruction from a register file addressed by the identified instruction to an operand cache;
initiating execution of the identified instruction by the execution unit;
receiving first results of the at least one unresolved conditional instruction;
determining, based on a predication state of the identified instruction, whether to write second results of executing the identified instruction in the operand cache, wherein the predication state is indicated by the first results of the at least one unresolved conditional instruction; and
in response to the first results indicating a known-not-to-execute predication state for the identified instruction, copying at least one operand corresponding to the identified instruction from the operand cache to the register file.

11. The method of claim 10, wherein copying the one or more operands corresponding to the identified instruction from the register file to the operand cache includes:
copying a destination operand stored at a destination register indicated by the identified instruction to a particular entry of the operand cache; and
marking the particular entry as being dirty.

12. The method of claim 11, wherein determining whether to write the second results of executing the identified instruction comprises, in response to the first results indicating the known-not-to-execute predication state, preventing the second results from executing the identified instruction from being written in the operand cache.

13. The method of claim 12, wherein copying the at least one operand from the operand cache to the register file comprises copying the destination operand to the destination register indicated by the identified instruction.

14. The method of claim 10, wherein determining whether to write the second results of executing the identified instruction comprises, in response to the first results indicating a known-to-execute predication state, initiating writing, in the operand cache, the second results of executing the identified instruction.

15. The method of claim 10, wherein the identified instruction is identified as having a known-to-execute predication state for the execution unit, and wherein the identified instruction is identified as having the known-not-to-execute predication state for another execution unit of a single instruction multiple data (SIMD) circuit that includes the execution unit.

16. The method of claim 10, further comprising identifying that a different instruction in the pipeline has the known-not-to-execute predication state based on one or more resolved conditional instructions.

17. The method of claim 16, wherein the different instruction depends from one or more unresolved conditional instructions in the pipeline.

18. A non-transitory computer readable storage medium having stored thereon design information that specifies a circuit design in a format recognized by a fabrication system that is configured to use the design information to fabricate a hardware integrated circuit that includes circuitry configured to operate according to the circuit design, wherein the circuitry includes:

a single instruction multiple data (SIMD) circuit comprising a plurality of execution units configured to execute parallel data instances of a series of instructions;

a register file configured to store a plurality of operands;

an operand cache configured to cache a subset of the plurality of operands;

a predication control circuit configured to:

identify, based on a pipeline of a particular one of the plurality of execution units including at least one unresolved conditional instruction, that a particular instruction in that pipeline has an unresolved predication state;

in response to determining that one or more operands indicated by the particular instruction are not stored in the operand cache, copy the one or more operands from the register file to the operand cache;

initiate execution of the particular instruction;

subsequent to initiating execution of the particular instruction, receive first results of the at least one unresolved conditional instruction;

in response to the first results indicating the particular instruction has a known-to-execute predication state, initiate writing, in the operand cache, second results of executing the particular instruction;

in response to the first results indicating the particular instruction has a known-not-to-execute predication state:

prevent the second results from executing the particular instruction from being written in the operand cache; and copy at least one operand corresponding to the particular instruction from the operand cache to the register file.

19. The non-transitory computer readable storage medium of claim 18, wherein the one or more operands indicated by the particular instruction include a destination operand stored at a destination register indicated by the particular instruction.

20. The non-transitory computer readable storage medium of claim 18, wherein the at least one unresolved conditional instruction includes a branch instruction.

* * * * *